US008345286B2

United States Patent
Ishigure

(10) Patent No.: US 8,345,286 B2
(45) Date of Patent: Jan. 1, 2013

(54) PRINTING SYSTEM AND INFORMATION PROCESSING APPARATUS INCLUDES A FIRST PRINTER DRIVER AND A PRINTER DRIVER ACQUISITION UNIT ACQUIRING THE SECOND PRINTER DRIVER

(75) Inventor: Tsuyoshi Ishigure, Tokyo (JP)

(73) Assignee: Oki Data Corporation, Tokyo (JP)

( * ) Notice: Subject to any disclaimer, the term of this patent is extended or adjusted under 35 U.S.C. 154(b) by 840 days.

(21) Appl. No.: 12/360,362

(22) Filed: Jan. 27, 2009

(65) Prior Publication Data
US 2009/0213416 A1    Aug. 27, 2009

(30) Foreign Application Priority Data

Feb. 21, 2008    (JP) .................................. 2008-040485

(51) Int. Cl.
G06F 3/12     (2006.01)
G06F 3/00     (2006.01)
G06F 9/44     (2006.01)
G06F 9/46     (2006.01)
G06K 15/00    (2006.01)
H04N 1/00     (2006.01)
H04N 1/60     (2006.01)

(52) U.S. Cl. ........ 358/1.15; 358/1.16; 358/1.6; 358/1.9; 719/311; 719/321; 719/328

(58) Field of Classification Search .................. 358/1.15, 358/1.1, 1.14, 1.9, 3.31, 2.1, 1.6, 321, 501, 358/537, 538, 539, 401, 405, 426.03, 426.11, 358/438, 450, 453, 462; 719/321, 328, 311, 719/312, 313; 399/31, 72, 130, 361, 83; D18/36, 54
See application file for complete search history.

(56) References Cited

U.S. PATENT DOCUMENTS

| 7,907,313 | B2* | 3/2011 | Kurihara | 358/500 |
| 2006/0023240 | A1* | 2/2006 | Natori | 358/1.13 |
| 2006/0238777 | A1* | 10/2006 | Anno et al. | 358/1.1 |
| 2006/0238786 | A1* | 10/2006 | Sakura et al. | 358/1.9 |
| 2007/0216925 | A1* | 9/2007 | Nakamura | 358/1.13 |
| 2007/0216939 | A1* | 9/2007 | Wada et al. | 358/1.15 |
| 2009/0097047 | A1* | 4/2009 | Mitsui | 358/1.9 |
| 2009/0122341 | A1* | 5/2009 | Natori | 358/1.15 |

FOREIGN PATENT DOCUMENTS

| JP | 2003-241930 A | 8/2003 |
| JP | 2003271340 A | 9/2003 |

(Continued)

Primary Examiner — Benny Q Tieu
Assistant Examiner — Ngon Nguyen
(74) Attorney, Agent, or Firm — Panitch Schwarze Belisario & Nadel LLP

(57) ABSTRACT

A printing system includes an information processing apparatus, an image forming apparatus, and a printer driver storage device. The information processing includes a first printer driver to operate during preparation of general print data, the image forming apparatus prints based on print data, and the printer driver storage device stores a second printer driver to operate during preparation of specific print data having an instruction specialized for the image forming apparatus. The information processing apparatus includes a printer driver acquisition unit acquiring the second printer driver, a printer connection detection unit, and a print data preparation unit preparing the print data using one of the printer drivers. The printer connection detection unit allows a user to select whether to acquire the second printer driver, allows the printer driver acquisition unit to acquire the second printer driver, and allows one of the printer drivers to correspond to the image forming apparatus.

23 Claims, 13 Drawing Sheets

FOREIGN PATENT DOCUMENTS

| | | |
|---|---|---|
| JP | 2005301608 A | 10/2005 |
| JP | 2007034898 A | 2/2007 |
| JP | 2007316921 A | 12/2007 |
| JP | 2008027006 A | 2/2008 |

* cited by examiner

| ITEM | VALUE |
|---|---|
| CATEGORY INFO. OF APPARATUS | PRINTER |
| MAKER INFO. | ABC |
| MODEL INFO. | PR1234 |
| SERIAL INFO. | ABC12345678 |
| PROCESSABLE LANGUAGE INFO. | PUBLIC LANGUAGE |
| SPECIFIC DRIVER STORAGE LOCATION INFO. | PRINTER:/ /DRIVER |
| VERSION INFO. OF SPECIFIC DRIVER | 1.2.3 |
| SPECIFIC DRIVER FUNCTION EXPLANATION INFO. | COLOR ADJUSTMENT TWO-SIDED PRINT |

FIG. 11B

PRINT SETTING

| BASIC SETTING | COLOR ADJUSTMENT | TWO-SIDED PRINT |

SHEET SIZE: A4(210 x 297mm)

NUMBER OF COPIES: 2

ORIENTATION: ● PORTRAIT  ○ LANDSCAPE

PRINT RANGE: ○ ALL
● BEGIN 3  END 10

PRINT  CANCEL

PRINTING SYSTEM AND INFORMATION PROCESSING APPARATUS INCLUDES A FIRST PRINTER DRIVER AND A PRINTER DRIVER ACQUISITION UNIT ACQUIRING THE SECOND PRINTER DRIVER

BACKGROUND OF THE INVENTION

1. Field of the Invention

The present invention relates to an information processing apparatus having a printer driver installed therein and a printing system including the information processing apparatus and an image forming apparatus.

2. Description of Related Art

A related art printing system includes an information processing apparatus and an image forming apparatus each of which is directly connected or indirectly connected through a communication line such as a network. The related art printing system acquires a printer driver, used in a case of converting application data prepared by a user into a printer language, from the image forming apparatus such as a printer, and installs the printer driver in the information processing apparatus. Such a related art printing system is disclosed, for example, in Japanese Un-examined Patent Application Publication No. 2003-241930.

In such a related art printing system, however, in a case of each connection of additional printer and information processing apparatus, the printer driver specialized for the printer (also referred to as a specific driver) is installed to the information processing apparatus, causing a waste of resource of the information processing apparatus.

The present invention provides a printing system and an information processing apparatus capable of effectively using a printer driver, included in the information processing apparatus, to operate in a course of preparing general print data including a basic instruction, thereby reducing a waste of resource of the information processing apparatus in a case of connecting additional image forming apparatus such as a printer. Such a printer driver is hereafter referred to as a general driver throughout the specification.

BRIEF SUMMARY OF THE INVENTION

According to one aspect of the invention, a printing system includes: an information processing apparatus including a first printer driver to operate in a course of preparing general print data having a basic instruction; an image forming apparatus performing print operation based on print data including the general print data prepared by the information processing apparatus; and a printer driver storage device storing a second printer driver to operate in a course of preparing specific print data having an instruction specialized for the image forming apparatus. The information processing apparatus further includes: a printer driver acquisition unit acquiring the second printer driver stored in the printer driver storage device; a printer connection detection unit allowing a user to select whether or not to acquire the second printer driver in a case of detecting connection with the image forming apparatus, allowing the printer driver acquisition unit to acquire the second printer driver based on a selection made by the user, and allowing one of the first and second printer drivers to correspond to the image forming apparatus; and a print data preparation unit preparing the print data, including at least one of the general print data and the specific print data, using at least one of respective first and second printer drivers corresponded by the printer connection detection unit.

According to another aspect of the present invention, an information processing apparatus includes: a first printer driver operating in a course of preparing general print data including a basic instruction; a printer driver acquisition unit acquiring a second printer driver from a printer driver storage device storing the second printer driver to operate in a course of preparing specific print data including an instruction specialized for an image forming apparatus; a printer connection detection unit allowing a user to select whether or not to acquire the second printer driver in a case of detecting connection with the image forming apparatus, allowing the printer driver acquisition unit to acquire the second printer driver based on a selection made by the user, and allowing one of the first and second printer drivers to correspond to the image forming apparatus; and a print data preparation unit preparing print data including at least one of the general print data and the specific print data using at least one of respective first and second printer drivers corresponded by the printer connection detection unit.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein:

FIG. 11B is a schematic diagram illustrating another example screen displayed by the specific driver function information display unit;

DETAILED DESCRIPTION OF PREFERRED EMBODIMENTS

Figures 1, 2:
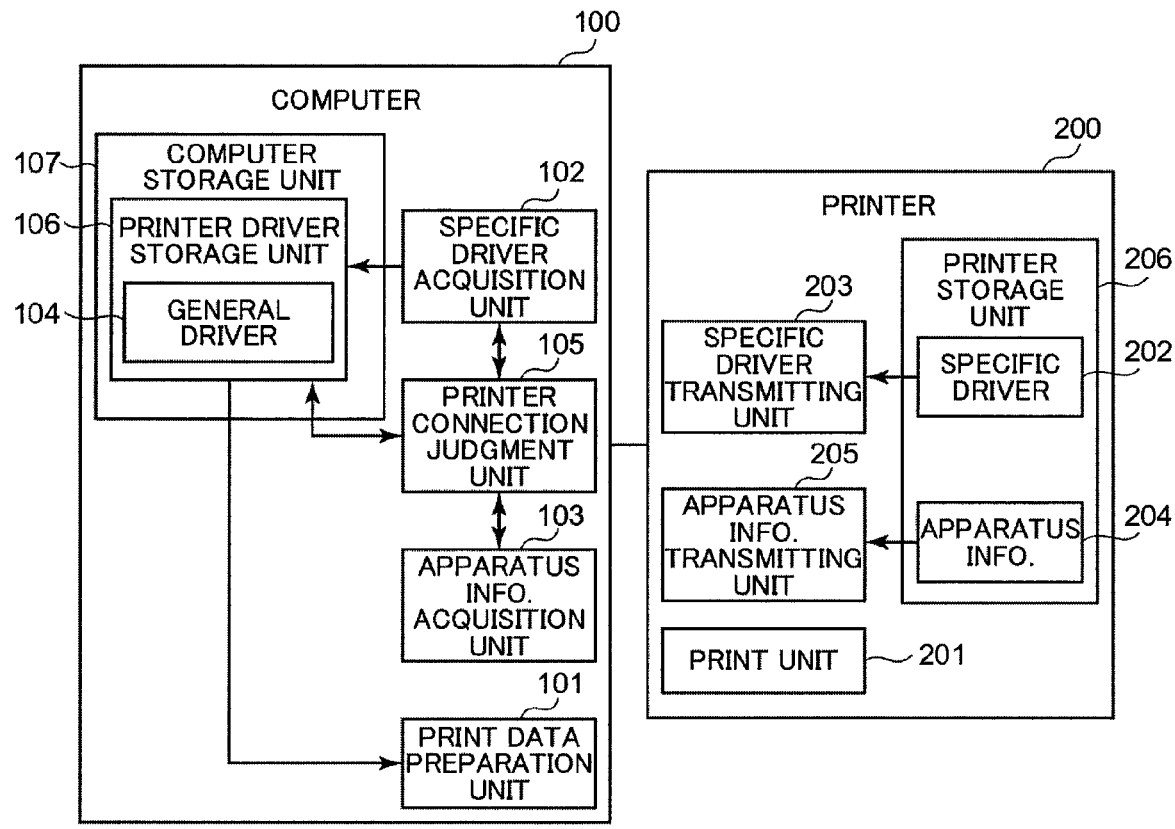
FIG. 1 is a block diagram illustrating a printing system according to a first embodiment of the present invention.
FIG. 2 is a schematic diagram illustrating an example of apparatus information.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, like reference numerals designate identical or corresponding parts throughout the several views.

First Embodiment

A printing system according to a first embodiment of the present invention is described with reference to FIG. 1. The printing system includes a computer 100 serving as an information processing apparatus and a printer 200 serving as an image forming apparatus. The computer 100 converts application data prepared by a user into print data and supplies to the image forming apparatus, and the printer 200 prints an image based on the print data transmitted from the information processing apparatus. The computer 100 and the printer 200 are connected by a connection method so as to be detected by an interface, for example, a universal serial bus (UBS). A general driver 104 (described later) serving as a first printer driver is installed in the computer 100 beforehand. A specific driver 202 (described later) serving as a second printer driver is stored in a printer storage unit 206 serving as a printer driver storage device. The computer 100 and the printer 200 are described in detail below.

The computer 100 includes: a print data preparation unit 101 preparing the print data by cooperation with the printer driver; a specific driver acquisition unit 102, serving as a printer driver acquisition unit, acquiring the specific driver 202 serving as the second printer driver from the printer 200 connected; an apparatus information acquisition unit 103 acquiring apparatus information 204 (described later) from the printer 200 connected; the general driver 104; a printer connection judgment unit 105 detecting connection with the printer 200 and judging whether to correspond the general driver 104 already installed to the printer 200 in the course of detection to the printer 200 or additionally acquire and install the specific driver 202; a printer driver storage unit 106, serving as an installation region of the printer driver, storing the general driver 104 already installed; and a computer storage unit 107, serving as a storage device of the computer 100, storing the printer driver storage unit 106.

The print data preparation unit 101 is activated from application software (not shown) by an instruction of a user. The print data preparation unit 101 cooperates with the printer driver stored in the printer driver storage unit 106, thereby converting the application data prepared by the user into the printer language readable by the printer 200 and preparing the print data. The print data prepared by the print data preparation unit 101 is transmitted to the printer 200.

The specific driver acquisition unit 102 requests with respect to a specific driver transmitting unit 203 (described later) of the printer 200 connected to transmit the excusive driver 202, receives the specific driver 202 transmitted from the excusive driver transmitting unit 203 of the printer 200, and executes the installation of the specific driver 202 by storing in the printer driver 106.

The apparatus information acquisition unit 103 requests with respect to an apparatus information transmitting unit 205 (described later) to transmit the apparatus information 204, and receives the apparatus information 204 transmitted from the apparatus information transmitting unit 205 of the printer 200.

The general driver 104 serves as a printer driver that is commonly applicable with respect to the printer 200 corresponding to the printer language of widely know, for example, PostScript™. In a case where the print data is prepared using the general driver 104, the print data having a basic instruction defined by such a printer language is prepared. However, since the print data having an instruction specialized for the printer 200 is not prepared, print operation using all of functions of the printer 200 is not executed. Here, the instruction specialized for the printer 200 is, for example, an instruction to select whether to use dithering or error diffusion in a course of a half-tone procedure of a multi-color image. Since the instruction specialized for such a printer 200 is not prepared, all of the print operation are executed by a standard parameter of the printer 200 in a case where the print data is prepared using the general driver 104. Moreover, the general driver 104 includes a basic function only, thereby reducing a consumption amount of a resource in a case of being installed in the computer 100. According to the first embodiment, the general driver 104 can prepare the print data having "PUBLIC LANGUAGE" of the printer language.

The printer connection judgment unit 105 is read in a case where the printer 200 is connected to and disconnected from interface of the computer 100. The printer connection judgment unit 105 is registered in a device driver of the interface beforehand so as to be read in a case where the printer 200 of a specific maker is connected. According to the first embodiment, in a case where the printer 200 having maker information of "ABC" is connected to the computer 100, the printer connection judgment unit 105 is read. Moreover, the printer connection judgment unit 105 supplies an instruction with respect to the apparatus information acquisition unit 103 to transmit the apparatus information 204 of the printer 200 in a case where the printer 200 is connected. The printer connection judgment unit 105 examines whether or not the specific driver 202 of the printer 200 is already installed in the computer 100 based on the apparatus information 204 of the printer 200 received by the apparatus information acquisition unit 103. Moreover, the printer connection judgment unit 105 examines whether or not the printer 200 can print the print data prepared using the general driver 104. In a case where the printer 200 can print the print data prepared using the general driver 104, the printer connection judgment unit 105 provides a query with respect to the user whether to correspond the general driver 104 already installed to the printer 200 or whether to acquire and install the excusive driver 202 of the printer 200. For example, in a case where the user selects to install the specific driver 202, the printer connection judgment unit 105 acquires a storage location of the specific driver 202 from the apparatus information 204 of the printer 200 and supplies the instruction to the specific driver acquisition unit 102 to acquire the specific driver 202. The specific driver 202 acquired by the specific driver acquisition unit 102 is installed by being stored in the printer driver storage unit 106. On the other hand, in a case where the user selects to use the general driver 104 already installed in the computer 100, the printer connection judgment unit 105 allows the general driver 104 already installed to correspond to the printer 200 and allows the general driver 104 to be the printer driver of the printer 200. In a case where the printer 200 cannot print the print data prepared using the general driver 104, the printer connection judgment unit 105 acquires the storage location of the specific driver 202 of the printer 200 and supplies the instruction to the specific driver acquisition unit 102 to acquire the specific driver 202. The specific driver 202 acquired by the specific driver acquisition unit 102 is installed by being stored in the printer driver storage unit 106. Moreover, the printer connection judgment unit 105 operates in a case where the computer 100 and the printer 200 are disconnected. In a case where the printer driver corresponding to the printer 200 being disconnected from the computer 100 is the general driver 104, the printer connection judgment unit 105 cancels the correspondence between the general driver 104 and the printer 200. The printer connection judgment unit 105 is read in a case where the interface of the computer 100 is connected to and disconnected from the printer 200. Alternatively, the printer connection judgment unit 105 may monitor the interface of the computer 100 and may monitor the connection and disconnection of the printer 200.

The print data preparation unit 101, the specific driver acquisition unit 102, the apparatus information acquisition unit 103, the general driver 104, and the printer connection judgment unit 105 described above are mounted as programs in the computer 100. Each of such programs may be stored in a volatile memory of the computer 100 or a nonvolatile memory such as a read only memory (ROM). In addition, each of such programs may be mounted as a nonvolatile rewritable storage device such as a flash memory or may be mounted as a magnetic medium such as hard disk.

The printer driver storage unit 106 serves as the installation region of the printer driver. According to the first embodiment, the general driver 104 is already installed. The printer connection judgment unit 105 allows the printer driver already installed to correspond to the printer 200, thereby providing a function of the printer driver.

The computer storage unit 107 serves as the storage device of the computer 100 and stores the printer driver storage unit 106. The computer storage unit 107 may be mounted as the volatile memory, the nonvolatile rewritable storage device such as the flash memory or the magnetic medium such as the hard disk.

The computer 100 includes an input device (not shown) such as a keyboard or a pointing device serving as user interface, and a display device (not shown) such as a cathode ray tube (CRT) display or a liquid crystal display. In addition, the computer 100 includes a central processing unit (CPU, not shown) controlling operation thereof and a primary storage device (not shown) such as a memory serving as a working area of the CPU.

Now, the printer 200 is described in detail. The printer 200 includes: a print unit 201 printing the image based on the print data transmitted from the computer 100; the specific driver 202; the specific driver transmitting unit 203 transmitting the specific driver 202 to the computer 100 connected; the apparatus information 204 serving as driver information of the printer 200; the apparatus information transmitting unit 205 transmitting the apparatus information 204 to the computer 100 connected; and the printer storage unit 206 not only serving as a storage device of the printer 200 but also serving as the printer driver storage device storing the specific driver 202 and the apparatus information 204.

The print unit 201 prints print data rasterized on a recording medium. For example, in a case of an electrophotographic printer, an electrostatic latent image is formed on a photosensitive drum (not shown) based on the print data, and toner is adhered to such an electrostatic latent image, thereby forming a toner image. Such a toner image is transferred to the recording medium, thereby printing the image based on the print data.

The specific driver 202 is installed in the computer 100 and serves as the program preparing the print data by cooperation with the print data preparation unit 101. The specific driver 202 includes a function of the general driver 104. Since the specific driver 202 can prepare the print data including the instruction specialized for the printer 200, the print operation is executed using all of the functions of the printer 200, for example, a color adjustment function and a two-sided printing function. Moreover, the specific driver 202 can allow a dialog screen, corresponding to a print setting dialog screen, specialized for the printer 200 to be displayed. Since the specific driver 202 includes information of the print setting dialog screen and the program preparing the instruction specialized for the printer 200, a greater amount of the resource is consumed relative to the general driver 104 in a case where the specific driver is installed in the computer 100.

The specific driver transmitting unit 203 transmits the specific driver 202 stored in the printer storage unit 206 to the computer 100 in response to a transmission request of the specific driver 202 by the specific driver acquisition unit 102 of the computer 100 connected.

The apparatus information 204 stores, for example, as illustrated in FIG. 2, category information of the apparatus, maker, model, and serial information of the printer 200, processable language information, specific driver storage location information, version information of the specific driver, and information of the specific driver function explanation. As illustrated in FIG. 2, information such as "printer," "ABC," "PR1234," "AB12345678," "PUBLIC LANGUAGE," "PRINTER//DRIVER," "1.2.3," and "COLOR ADJUSTMENT, TWO-SIDED PRINT" is stored as the category information of the apparatus, the maker, model, and serial information of the printer 200, the processable language information, the specific driver storage location information, the version information of the specific driver, and the information of the specific driver function explanation, respectively. Herein, the "PUBLIC LANGUAGE" indicates the printer language printable by the general driver 104 stored in the computer 100 as described above with the general driver 104. The "PRINTER//DRIVER" of the specific driver storage location information indicates a directory location in which the specific driver 202 is stored, for example, a computer connected to the printer 200. The specific driver 202 is stored in such a directory.

The apparatus information transmitting unit 205 transmits the apparatus information 204 stored in the printer storage unit 206 in response to a transmission request of the apparatus information 204 by the apparatus information acquisition unit 103 of the computer 100 connected.

The specific driver 202, the specific driver transmitting unit 203, and the apparatus information transmitting unit 205 are mounted as the programs in the printer 200. Each of such programs may be stored in a volatile memory of the printer 200 or a nonvolatile memory such as a read only memory (ROM). In addition, each of such programs may be mounted as a nonvolatile rewritable storage device such as a flash memory or may be mounted as a magnetic medium such as hard disk.

The printer storage unit 206 stores the specific driver 202 and the apparatus information 204 of the printer 200. The printer storage unit 206 may be mounted as the volatile memory, the nonvolatile rewritable storage device such as the flash memory or the magnetic medium such as the hard disk.

The printer 200 includes an operation panel (not shown) serving as user interface. In addition, the printer 200 includes a central processing unit (CPU, not shown) controlling operation thereof and a primary storage device (not shown) such as a memory serving as a working area of the CPU.

According to the first embodiment, the apparatus information 204 of the printer 200 is stored in the printer storage unit 206. However, the apparatus information 204 is not limited to be stored in the printer storage unit 206. The apparatus information 204 may be stored in another storage device included in the printer 200, or may be stored in a storage device included in the computer 100. According to the first embodiment, the specific driver 202 is stored in the printer storage unit 206. However, the specific driver 202 is not limited to be stored in the printer storage unit 206. The specific driver 202 may be stored in another information processing apparatus (not shown) such as a server.

Figure 3:
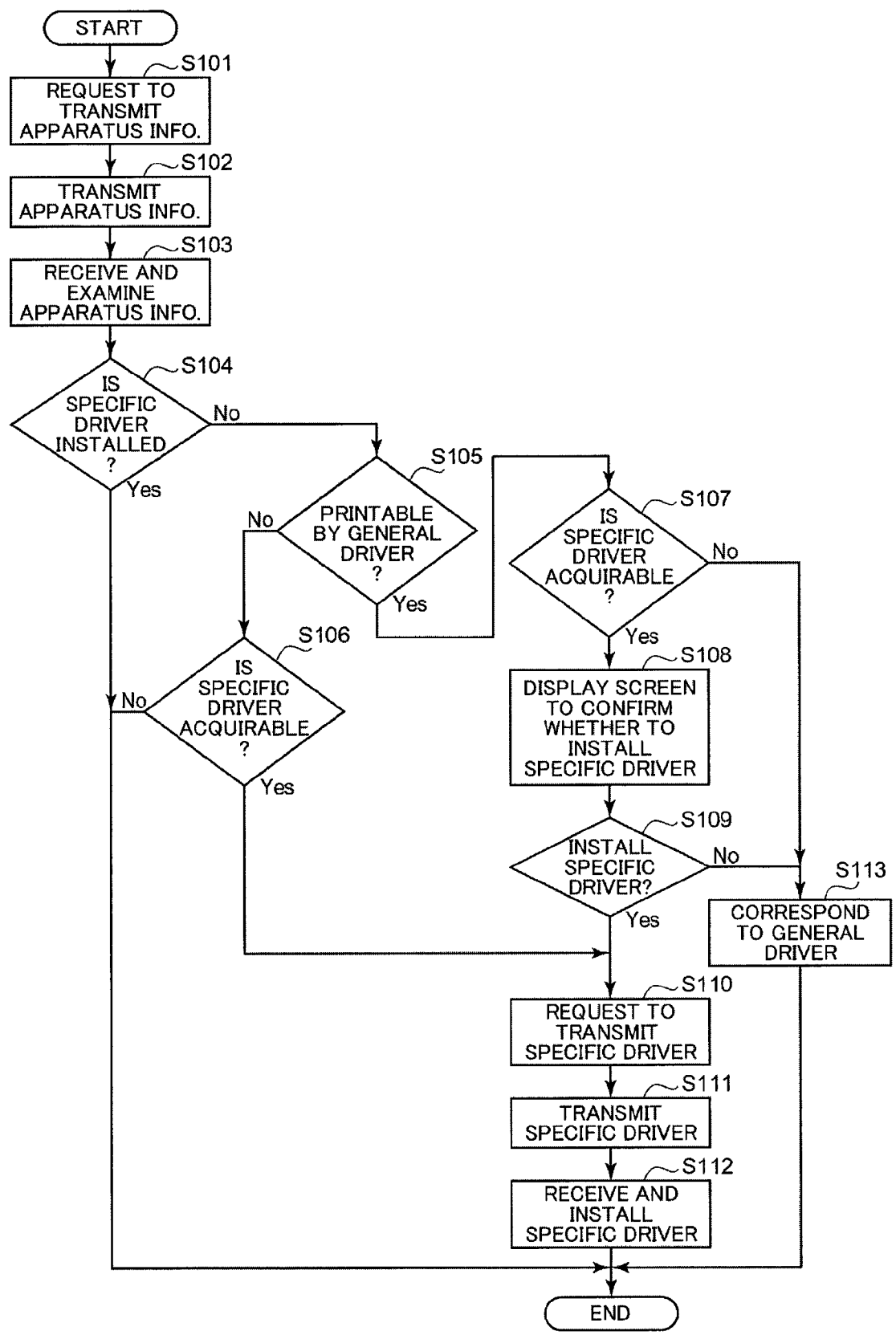
FIG. 3 is a flowchart illustrating an example procedure in a case where a computer serving as an information processing apparatus and a printer serving as an image forming apparatus are connected.

Referring to a flowchart of FIG. 3, an example procedure in a case where the computer 100 and the printer 200 are connected is described.

In step S101, in a case where the printer connection judgment unit 105 detects that the printer 200 is connected to the computer 100, the printer judgment unit 105 supplies the instruction with respect to the apparatus information acquisition unit 103 to acquire the apparatus information 204 of the printer 200. Upon receiving the acquisition instruction, the apparatus information acquisition unit 103 requests with respect to the apparatus information transmitting unit 205 of the printer 200 to transmit the apparatus information 204.

Upon receiving the transmission request of the apparatus information 204 of the printer 200, the apparatus information transmitting unit 205 reads the apparatus information 204 stored in the printer storage unit 206 and transmits to the apparatus information acquisition unit 103 (step S102).

Upon acquiring the apparatus information 204, the apparatus information acquisition unit 103 supplies the apparatus information 204 to the printer connection judgment unit 105. Upon being supplied with the apparatus information 204, the printer connection judgment unit 105 examines the apparatus information 204 (step S103).

Subsequently, in step S104, the printer connection judgment unit 105 examines whether or not the specific driver 202 corresponding to the printer 200 is stored in the printer driver storage unit 106. That is, the printer connection judgment unit 105 examines whether or not the specific driver 202 is installed in the computer 100. In a case where the specific driver 202 is installed (Yes in step S104), the printer connection judgment unit 105 ends the procedure. On the other hand, in a case where the specific printer 202 is not installed (No in step S104), flow proceeds to step S105.

In step S105, the printer connection judgment unit 105 refers to the apparatus information 204 and examines whether or not the printer 200 can print the print data prepared using the general driver 104. Particularly, the printer connection judgment unit 105 examines whether or not the processable language of the apparatus information 204 includes the "PUBLIC LANGUAGE." In a case where the processable language does not include the "PUBLIC LANGUAGE" (No in step S105), flow proceeds to step S106 (described later). On the other hand, in a case where the processable language includes the "PUBLIC LANGUAGE" (Yes in step S105), flow proceeds to step S107 (described later).

In a case where the processable language does not include the "PUBLIC LANGUAGE" (No in step S105), the printer connection judgment unit 105 refers to the specific driver storage location information of the apparatus information 204 and examines whether or not the specific drive is acquirable (step S106). In a case where the specific driver 202 is acquirable (Yes in step S106), the printer connection judgment unit 105 supplies the instruction with respect to the specific driver acquisition unit 102 to acquire the specific driver 202 of the printer 200 in step S110. On the other hand, in a case where the specific driver 202 is not acquirable (No in step S106), the printer connection judgment unit 105 ends the procedure. Herein, the printer connection judgment unit 105 may request, for example, a storage medium such as CD-ROM in which the specific driver 200 corresponding to the printer 200 is stored, with respect to the user and may install the specific driver 202 instead of ending the procedure.

In a case where the processable language includes the "PUBLIC LANGUAGE" (Yes in step S105), the printer connection judgment unit 105 refers to the specific driver storage location information of the apparatus information 204 and examines whether or not the specific driver 202 is acquirable (step S107). In a case where the specific driver 202 is acquirable (Yes in step S107), flow proceeds to step S108 (described later). On the other hand, in a case where the specific driver 202 is not acquirable (No in step S107), flow proceeds to step S113 (described later).

Figure 4A:
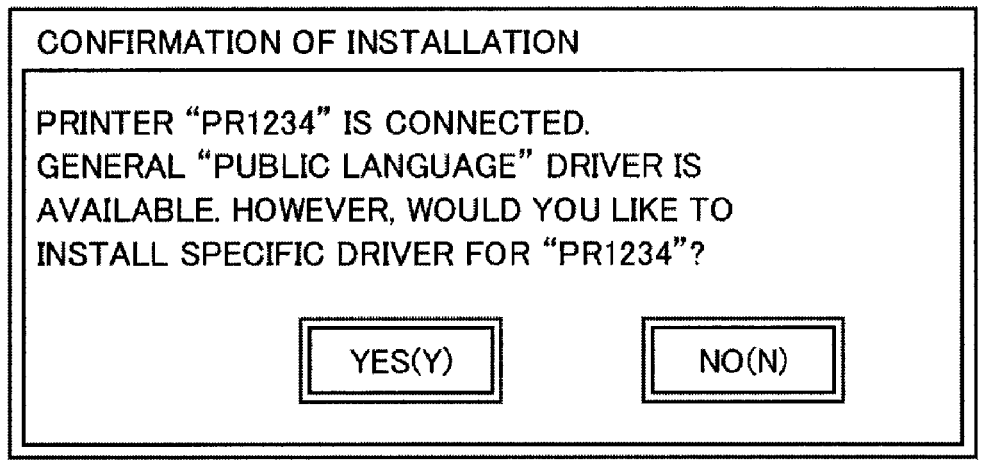
FIG. 4A is a schematic diagram illustrating an example of a selection screen.
Figure 4B:
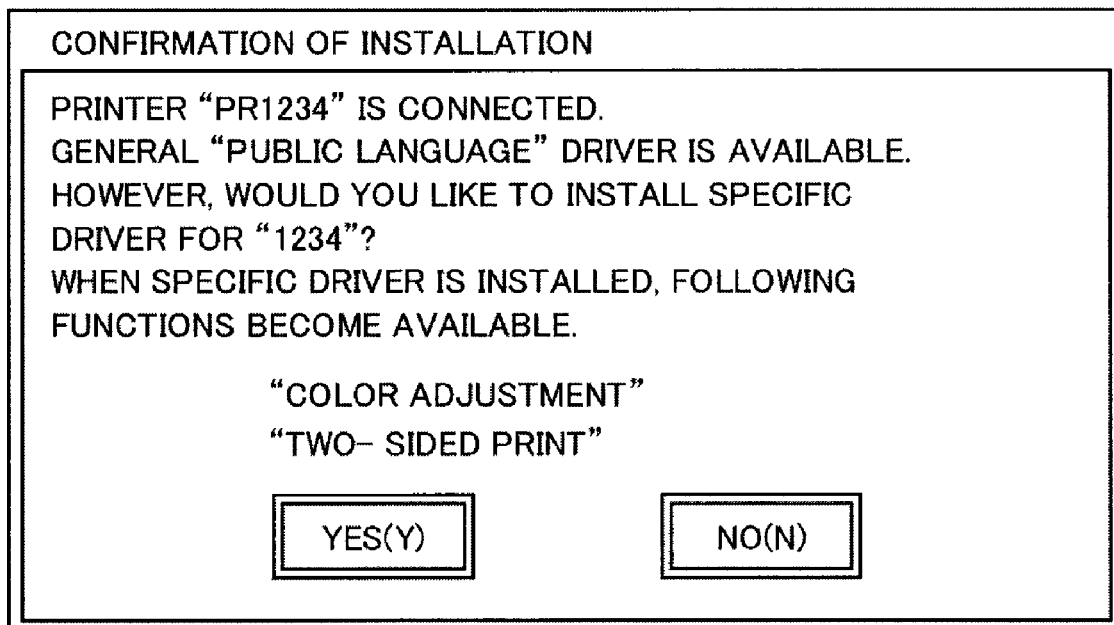
FIG. 4b is a schematic diagram illustrating another example of a selection screen.

In a case where the specific driver 202 is acquirable (Yes in step S107), the printer connection judgment unit 105 allows, for example, selection screens as illustrated in FIGS. 4A and 4B, to be displayed so as to provide a query with respect to the user whether or not to install the specific driver 202, and waits until the user makes a selection (step S108). FIG. 4A is an example of the selection screen displayed in a case where the printer connection judgment unit 105 provides the query with respect to the user whether or not to install the excusive driver 202. Herein, for example, FIG. 4B may be displayed along with FIG. 4A. FIG. 4B is another example of the selection screen and includes, for example, the specific driver function explanation information such as "COLOR ADJUSTMENT, TWO-SIDED PRINT" included in the apparatus information 204 acquired from the printer 200.

In step S109, the printer connection judgment unit 105 examines whether or not the user permits the installation of the specific driver 202. In a case where the user permits the installation of the specific driver 202 (Yes in step S109), the printer connection judgment unit 105 supplies the instruction with respect to the specific driver acquisition unit 102 to acquire the specific driver 202 of the printer 200 in step S110. On the other hand, in a case where the user does not permit the installation of the specific driver 202 (No in step S109), flow proceeds to step S113 (described later).

Upon being supplied with the acquisition instruction of the specific driver 202 of the printer 200, the specific driver acquisition unit 102 requests with respect to the specific driver transmitting unit 203 to transmit the specific driver 202 (step S110).

Upon receiving the transmission request of the specific driver 202 of the printer 200, the specific driver transmitting unit 203 reads the specific driver 202 stored in the printer storage unit 206 and transmits to the specific driver acquisition unit 102 (step S111).

The specific driver acquisition unit 102 acquires the specific driver 202 and stores in the printer driver storage unit 106, thereby installing the specific driver 202 as the printer driver of the printer 200 (step S112).

In a case where the specific driver 202 is not acquirable (No in step S107), and in a case where the user does not permit the installation of the specific driver 202 (No in step S109), the printer connection judgment unit 105 allows the general driver 104 stored in the printer driver storage unit 106 to correspond to the printer 200 and allows the general driver 104 to be the printer driver of the printer 200 (step S113).

In a case where the computer 100 cannot acquire the specific driver 202 of the printer 200 by any reason, the general driver 104 is allowed to be the printer driver by corresponding to the printer 200, so that the user can execute the print operation using the computer 100 as long as the printer 200 is corresponded to the general driver 104.

Figure 5:
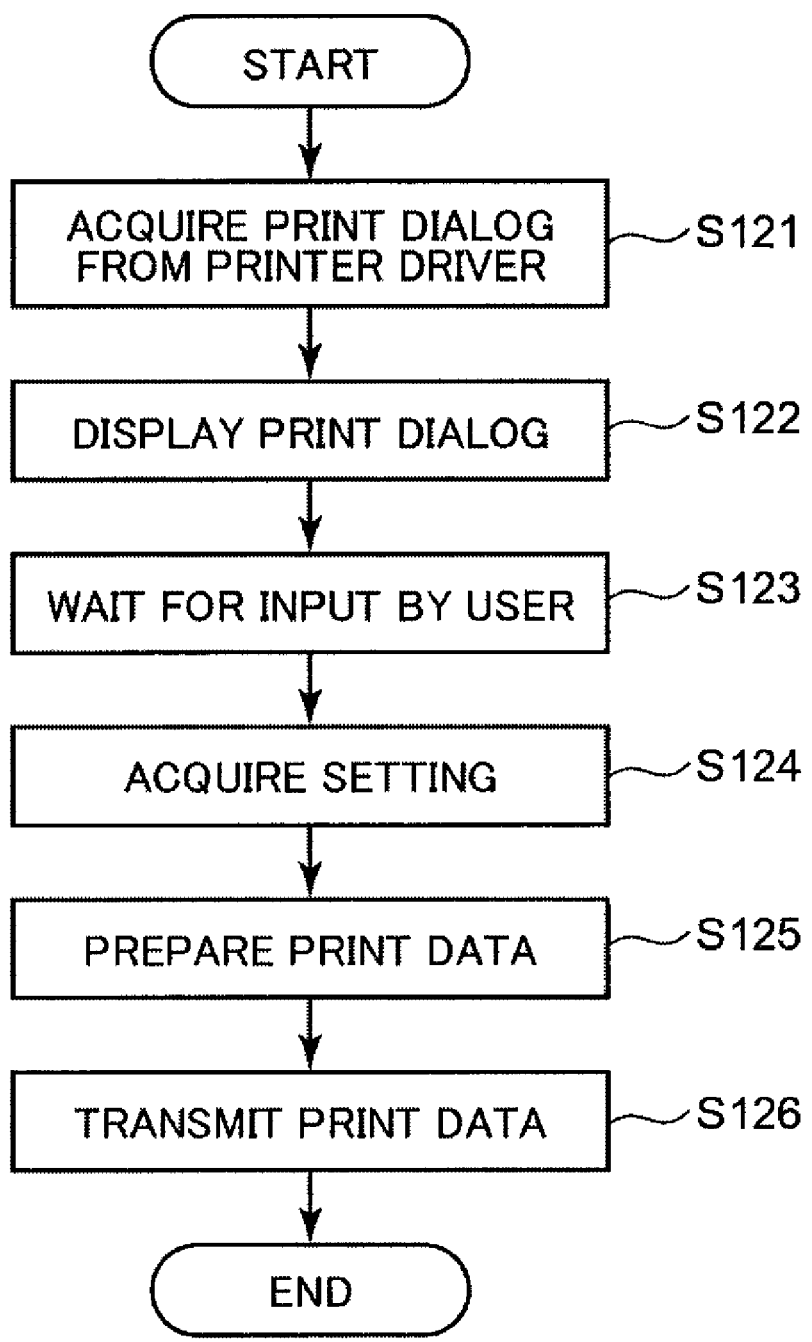
FIG. 5 is a flowchart illustrating an example procedure in a case of executing print operation.

Referring to a flowchart of FIG. 5, an example procedure of executing the print operation in a case where the user uses application software of the computer 100 is described. The user presses a print execution button (not shown) after preparing the application data by using prescribed application software. Subsequently, the print data preparation unit 101 is activated. The print data preparation unit 101 prepares a print setting dialog screen to be displayed to the user from the printer driver stored in the printer driver storage unit 106 (step S121).

Figure 6A:
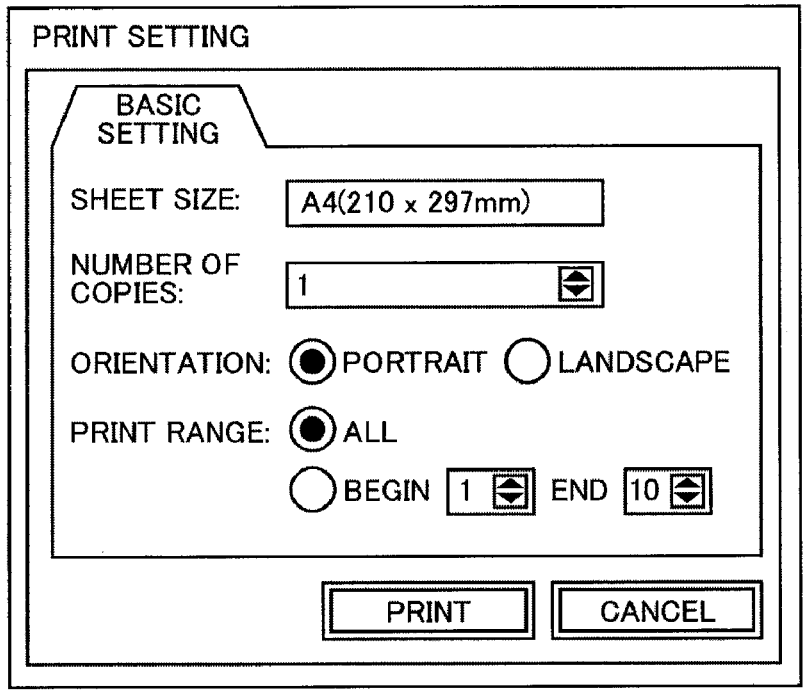
FIG. 6A is a schematic diagram illustrating an example of a print setting dialog screen.
Figure 6B:
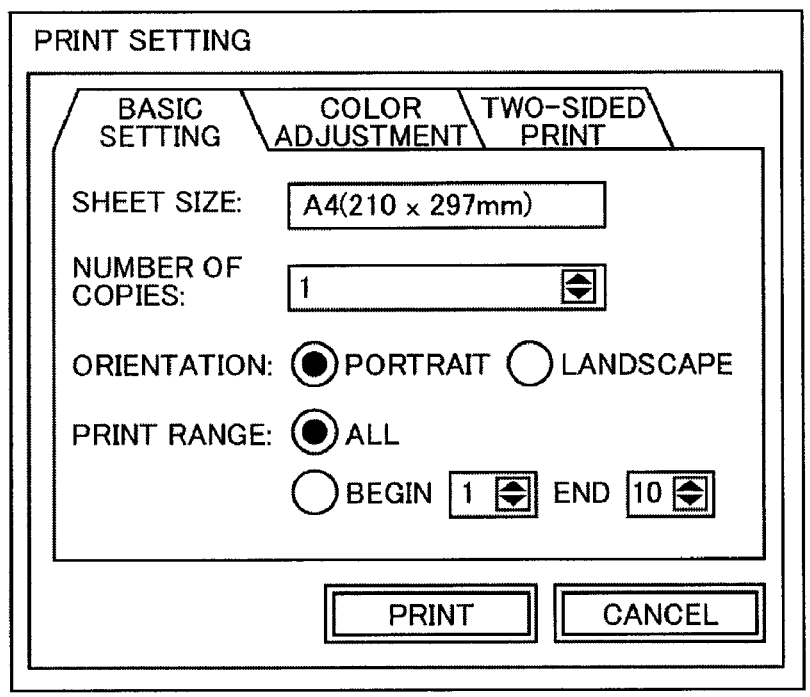
FIG. 6B is a schematic diagram illustrating another example of a print setting dialog screen.

In step S122, the print data preparation unit 101 allows the print setting dialog screen as illustrated in FIGS. 6A and 6B to be displayed. FIG. 6A illustrates an example of the print setting dialog screen in a case where the general driver 104 is used, and FIG. 6B illustrates an example of the print setting dialog screen in a case where the specific driver 202 is used. The print setting dialog screen of FIG. 6B includes tabs of "COLOR ADJUSTMENT" and "TWO-SIDED PRINT" in addition to a tab illustrated in FIG. 6A.

The print data preparation unit 101 waits unit the user finishes an input (step S123). In a case where the user presses a "PRINT" button of FIG. 6A, flow proceeds to step S124 (described later). On the other hand, in a case where the user presses a "CANCEL" button (not shown in flowchart of FIG. 5), the print data preparation unit 101 ends the procedure.

In a case where the user presses the "PRINT" button in step S123, the print data preparation unit 101 acquires a setting content provided in the print setting dialog screen by the user (step S124). The print data preparation unit 101 prepares the print data based on the setting content acquired in step S124 (step S125), and transmits the print data prepared to the printer 200 (step S126). Upon receiving the print data transmitted by the print data preparation unit 101, the print unit 201 of the printer 200 prints the image based on the print data.

Figure 7:
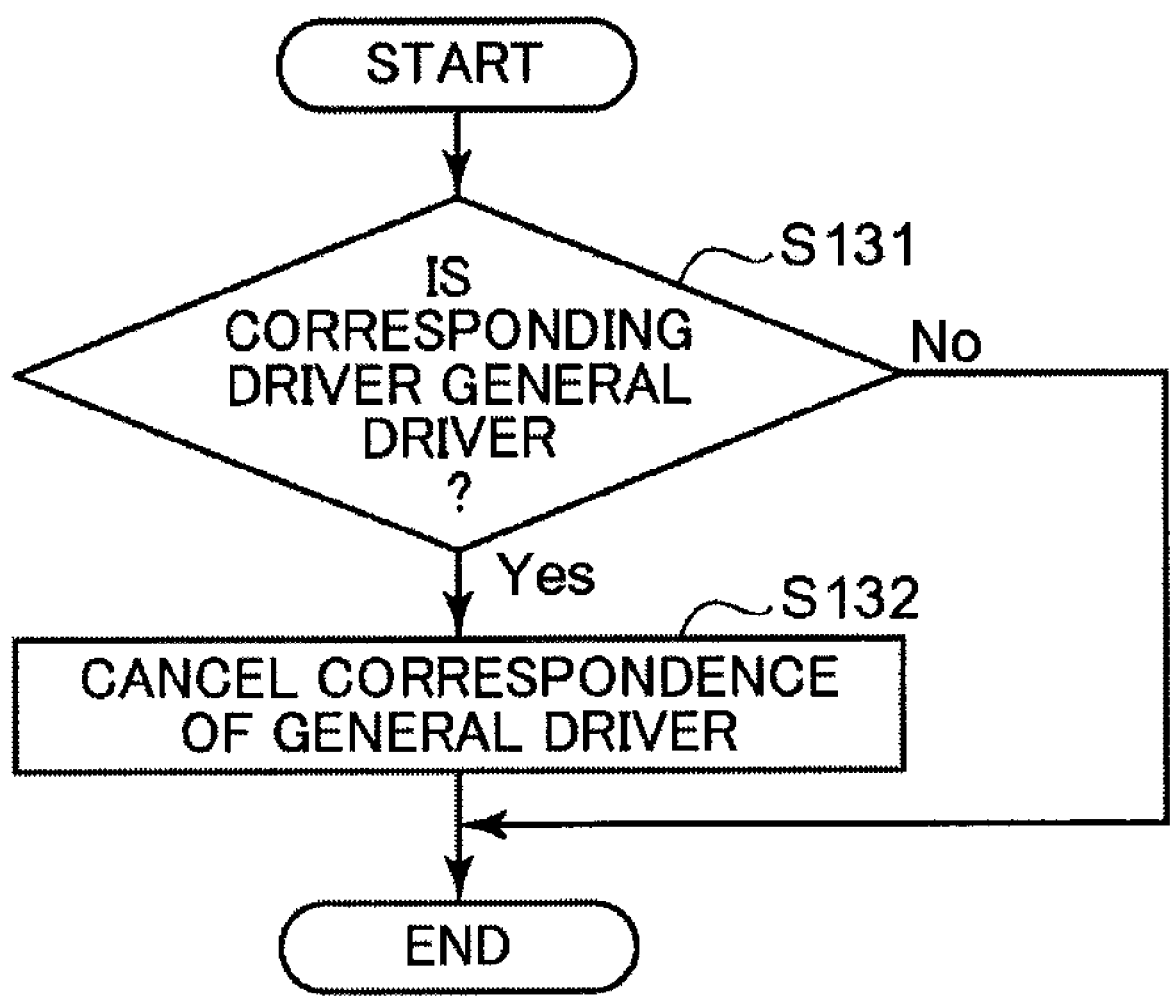
FIG. 7 is a flowchart illustrating an example procedure in a case where the computer serving as the information processing apparatus and the printer serving as the image forming apparatus are disconnected.

Referring to a flowchart of FIG. 7, an example procedure in a case of disconnecting the computer 100 from the printer 200 is illustrated.

In a case where the printer connection judgment unit 105 detects that the computer 100 and the printer 200 are disconnected, the printer connection judgment unit 105 examines whether the printer driver corresponding to the printer 200 disconnected is the general driver 104 or the specific driver 202 (step S131). In a case where the printer driver is the general driver 104 (Yes in step S131), flow proceeds to step S132 (described later). On the other hand, in a case where the printer driver is the specific driver 202 (No in step S131), the printer connection judgment unit 105 ends the procedure.

In a case where the printer driver is the general driver 104 (Yes in step S131), the printer connection judgment unit 105 cancels the correspondence between the general driver 104 stored in the printer driver storage unit 106 and the printer 200, and ends the procedure (step S132).

According to the first embodiment described above, in a case where the printer 200 corresponding to the general driver 104 is connected to the computer 100, the print operation is executed using the general driver 104 installed in the computer 100 beforehand, thereby reducing necessity of installing the specific driver 202 specialized for the printer 200 in the computer 100. Therefore, the computer 100 can reduce a waste of the resource thereof according to the first embodiment.

Second Embodiment

Figure 8:
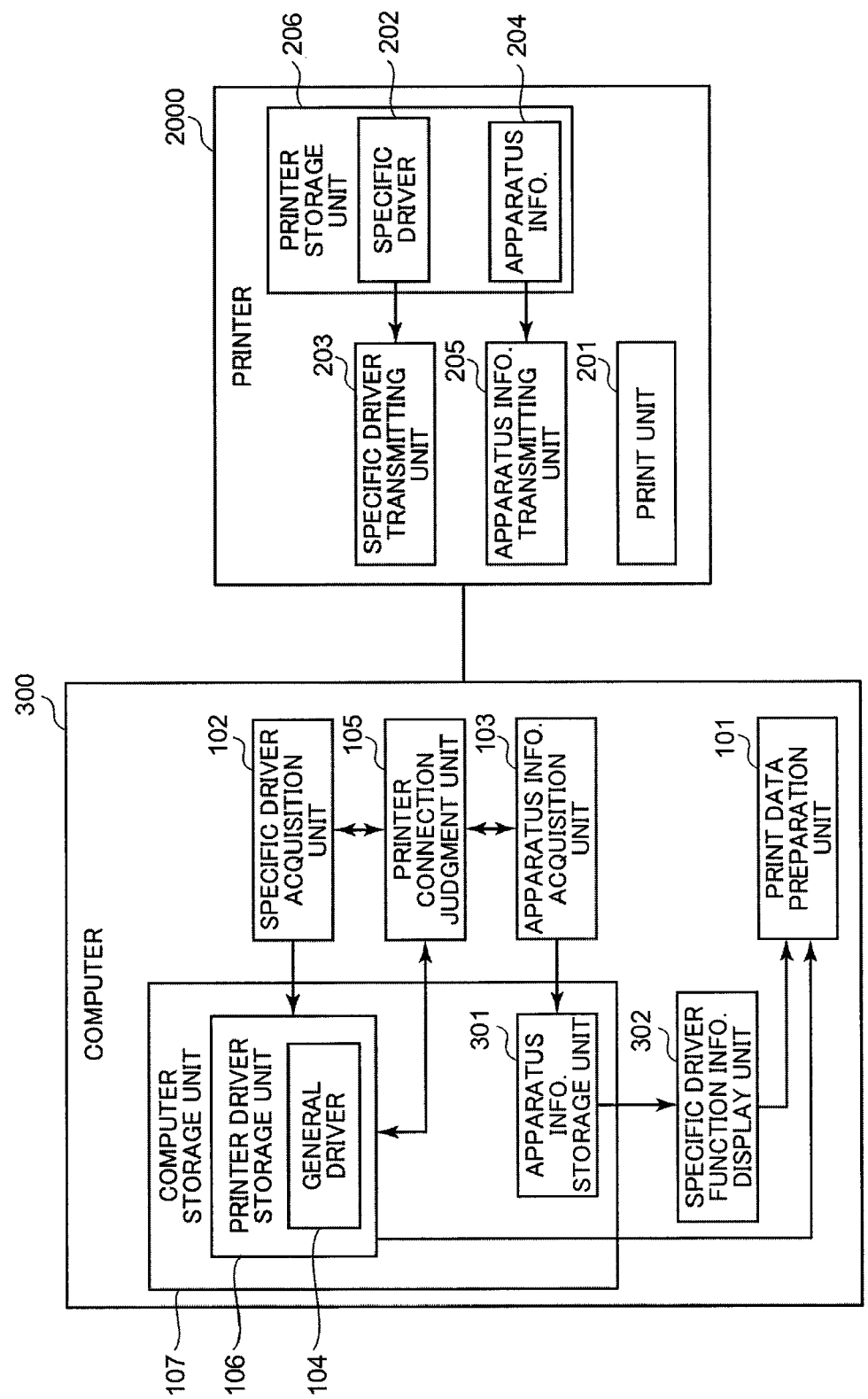
FIG. 8 is a block diagram illustrating a printing system according to a second embodiment of the present invention.

Referring to FIG. 8, a printing system according to a second embodiment of the present invention is illustrated. As illustrated in FIG. 8, the printing system includes a computer 300 serving as an information processing apparatus and a printer 2000 serving as an image forming apparatus. The computer 300 of the second embodiment is similar to the computer 100 of the first embodiment described above except for an apparatus information storage unit 301 serving as a driver information storage unit and a specific driver function information display unit 302 serving as a driver information display unit. The printer 2000 of the second embodiment is substantially similar to the printer 200 of the first embodiment. Only components and configurations of the computer 300 and the printer 2000 that differ from the computer 100 and the printer 200 of the above embodiment will be described, and like components will be given the same reference numerals as above and description thereof will be omitted.

The apparatus information storage unit 301 is stored in the computer 300 and stores apparatus information 204 acquired from the printer 2000 by an apparatus information acquisition unit 103.

The specific driver function information display unit 302 operates while a print setting dialog screen is being displayed by a print data preparation unit 101. In a case where a printer driver corresponding to the printer 2000 is a general driver 104, and in a case where the apparatus information 204 of the printer 2000 is stored in the apparatus information storage unit 301, the specific driver function information display unit 302 allows a button used for installation of a function of the excusive driver 202 and the specific driver of the printer 2000 to be displayed in a vicinity of the print setting dialog.

The specific driver function information display unit 302 of the computer 300 is mounted as a program in the computer 300. Such a program may be stored in a volatile memory of the computer 300 or a nonvolatile memory such as a read only memory (ROM). Moreover, the program may be mounted as a nonvolatile rewritable storage device such as a flash memory or may be mounted as a magnetic medium such as hard disk.

Figure 9:
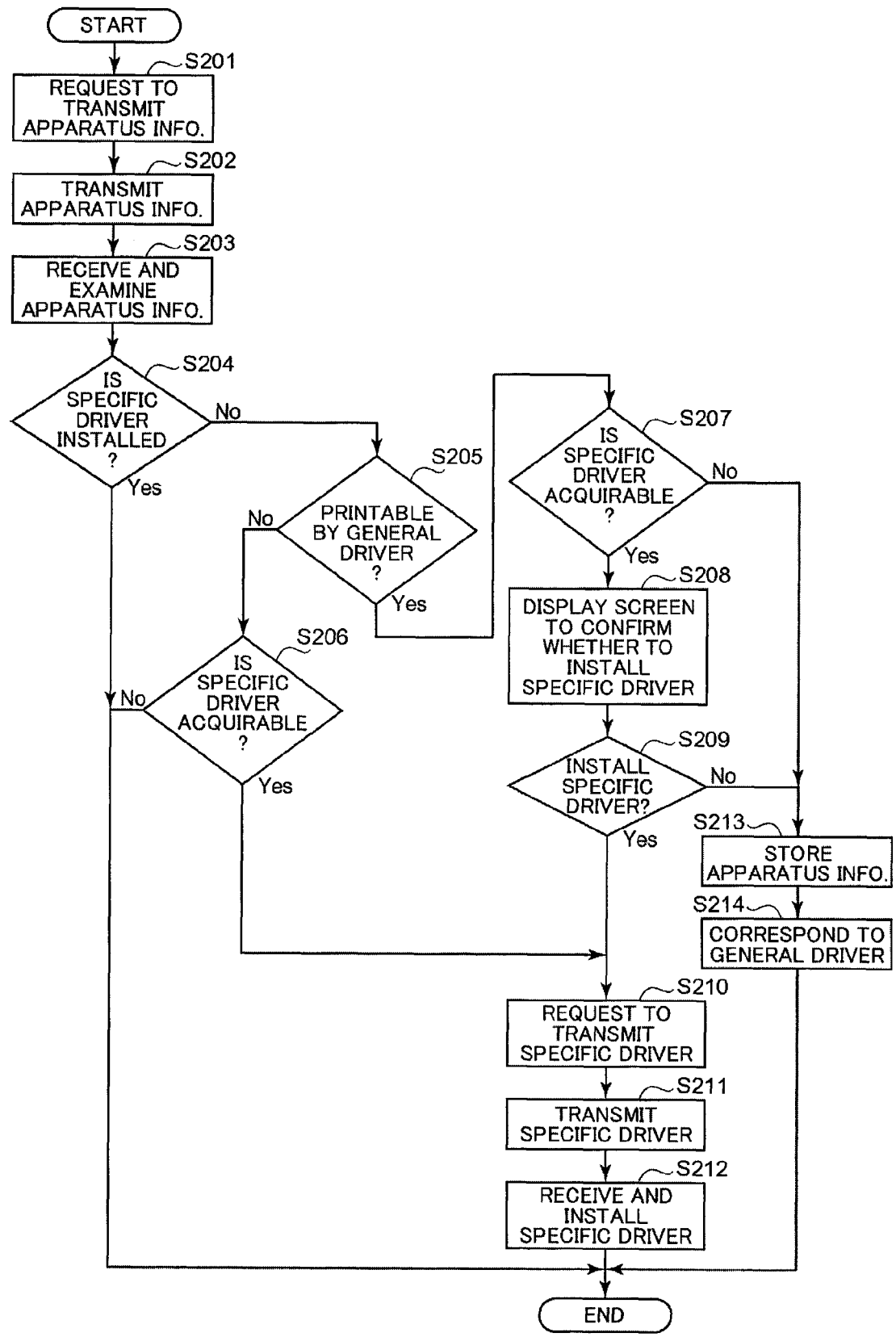
FIG. 9 is a flowchart illustrating an example procedure in a case where a computer serving as an information processing apparatus and a printer serving as an image forming apparatus are connected according to the second embodiment.

Referring to a flowchart of FIG. 9, an example procedure in a case where the computer 300 and the printer 2000 are connected is illustrated. Since procedure flow from step S201 to step S212 and step S214 of FIG. 9 is substantially similar to that from step S101 to step S112 and step S113 of FIG. 3, respectively, description of each step is omitted.

In a case where the specific driver 202 is not acquirable (No in step S207), and in a case where the installation of the specific driver 202 is not permitted (No is step S209), the apparatus information acquisition unit 103 stores the apparatus information 204 acquired in the apparatus information storage unit 301 (step S213).

Figure 10:
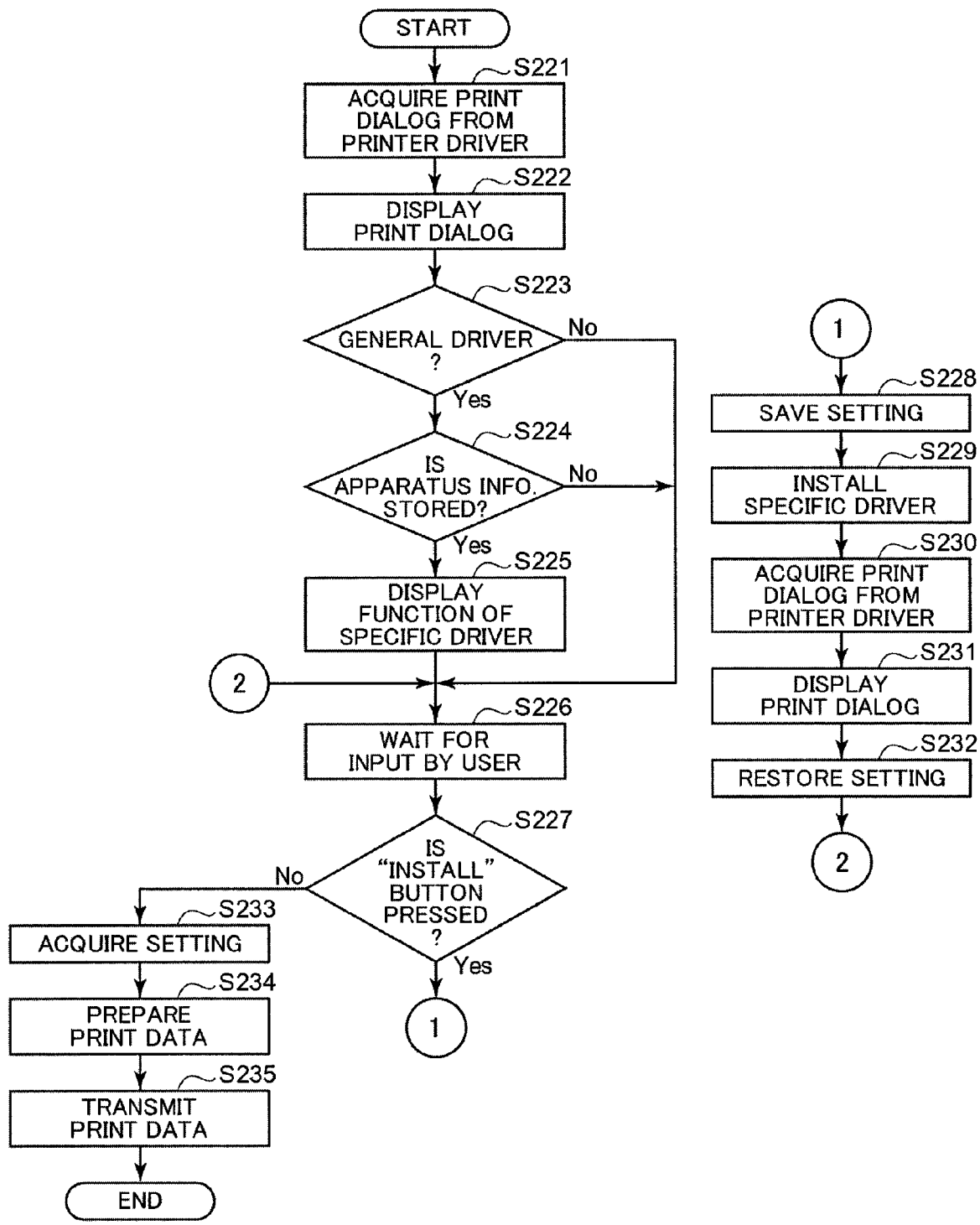
FIG. 10 is a flowchart illustrating an example procedure in a case of executing print operation.

Referring now to a flowchart of FIG. 10, an example procedure of executing print operation in a case where the user uses application software of the computer 300 is described. Since procedure flow of step S221, step S222, and step S226, and step S233 through step S235 of FIG. 10 is substantially similar to that of step S121, step S122, step S123, and step S124 through step S126 of FIG. 5, respectively, description of each step is omitted.

The specific driver function information display unit 302 examines whether or not the printer driver used by the print data preparation unit 101 is the general driver 104 (step S223). In a case where the printer driver used by the print data preparation unit 101 is the general driver 104 (Yes in step S223), flow proceeds to step S224 (described later). On the other hand, in a case where the printer driver used by the print data preparation unit 101 is not the general driver 104 (No in step S223), flow proceeds to step S226 (described later).

In a case where the printer driver used by the print data preparation unit 101 is the general driver 104 (Yes in step S233), the specific driver function information display unit 302 examines whether or not the apparatus information 204 corresponding to the printer 2000 is stored in the apparatus information storage unit 301 (step S224). In a case where the apparatus information 204 is stored in the information storage unit 301 (Yes in step S224), flow proceeds to step S225 (described later). On the other hand, in a case where the apparatus information 204 is not stored in the information storage unit 301 (No in step S224), flow proceeds to step S226 (described later).

Figure 11A:
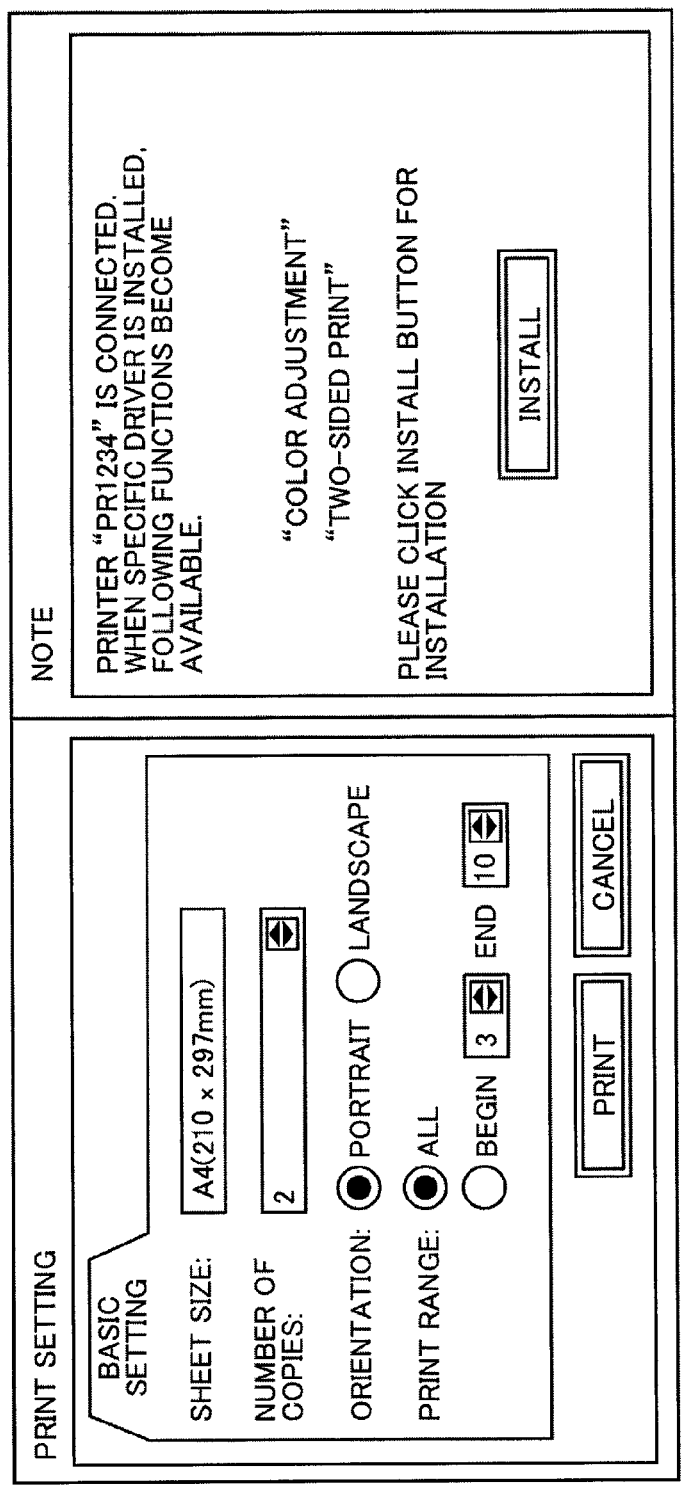
FIG. 11A is a schematic diagram illustrating an example screen displayed by a specific driver function information display unit.

In a case where the apparatus information 204 is stored in the information storage unit 301 (Yes in step S224), the specific driver function information display unit 302 allows the function of the specific driver 202 to be displayed at a side of the print setting dialog screen as illustrated in FIG. 11A, for example, and allows an "INSTALL" button for installation of the specific driver 202 to be displayed (step S225). FIG. 11A illustrates an example screen to be displayed in a case of using the general driver 104.

The specific driver function information display unit 302 waits until the user finishes an input (step S226). In a case where the "INSTALL" button is not pressed by the user (No in step S227), the specific driver function information display unit 302 ends the procedure while the print data preparation unit 101 proceeds a step beyond step S233 (described later). On the other hand, in a case where the "INSTALL" button is pressed by the user (Yes in step S227), the specific driver function information display unit 302 saves the setting content provided by the user in the print setting dialog screen (step S228). In a case where a "CANCEL" button is pressed by the user (not shown in the flowchart of FIG. 10), the specific driver function display unit 302 and the print data preparation unit 101 end the procedure.

The specific driver function information display unit 302 supplies the instruction with respect to the specific driver acquisition unit 102 to acquire the specific driver 202 of the printer 2000. Upon receiving the acquisition instruction of the specific driver 202 of the printer 2000, the specific driver acquisition unit 102 requests with respect to the specific driver transmitting unit 203 of the printer 2000 to transmit the specific driver 202. Upon receiving the transmission request, the specific driver transmitting unit 203 reads the specific driver 202 stored in the printer storage unit 206 and transmits to the specific driver acquisition unit 102. Upon acquiring the specific driver 202, the specific driver acquisition unit 102 stores the specific driver 202 in the printer driver storage unit 106, thereby installing the specific driver 202 as the printer driver of the printer 2000 (step S229).

Subsequently, in step S230, the print data preparation unit 101 prepares the print setting dialog screen to be provided to the user from the specific driver 202 stored in the printer driver storage unit 106, and allows the print setting dialog screen to be newly displayed (step S231).

The specific driver function information display unit 302 restores the setting content saved in step S228 in the print setting dialog newly displayed by the print data preparation unit 101 (step S232). FIG. 11B illustrates an example of the print setting dialog newly prepared and displayed. In such a print setting dialog screen of FIG. 11B, tabs of "COLOR ADJUSTMENT" and "TWO-SIDED PRINT" as functions of the specific driver 202 are included in addition to a tab illustrated in FIG. 11A, and the setting content input by the user is restored by the specific driver function information display unit 302. FIG. 11B illustrates an example screen to displayed in a case of using the specific driver 202.

According the second embodiment, the apparatus information acquisition unit 103 stores the apparatus information 204 in the apparatus information storage unit 301 in step S213 of FIG. 9. However, the apparatus information 204 may be re-acquired from the printer 2000 in step S224 of the flowchart of FIG. 10.

In a case where the printer 2000 is disconnected, and in a case where the printer driver corresponding to the printer 2000 is the general driver 104, the apparatus information 204 of the printer 2000 may be deleted from the apparatus information storage unit 301.

According to the second embodiment, the installation of the specific driver 202 is displayed on the print setting dialog screen, but is not limited thereto. For example, application software (not shown) capable of installing the specific driver 202 may be provided, and the specific driver 202 may be installed from such application software.

As described above, the specific driver function information display unit 302 allows the function of the specific driver 202 to be displayed in the course of the print operation by the user, thereby installing the specific driver 202 without re-connection of the printer 2000 according to the second embodiment. Therefore, the second embodiment can enhance a level of convenience for the user in addition to the advantages of the first embodiment described above.

Third Embodiment

Figure 12:
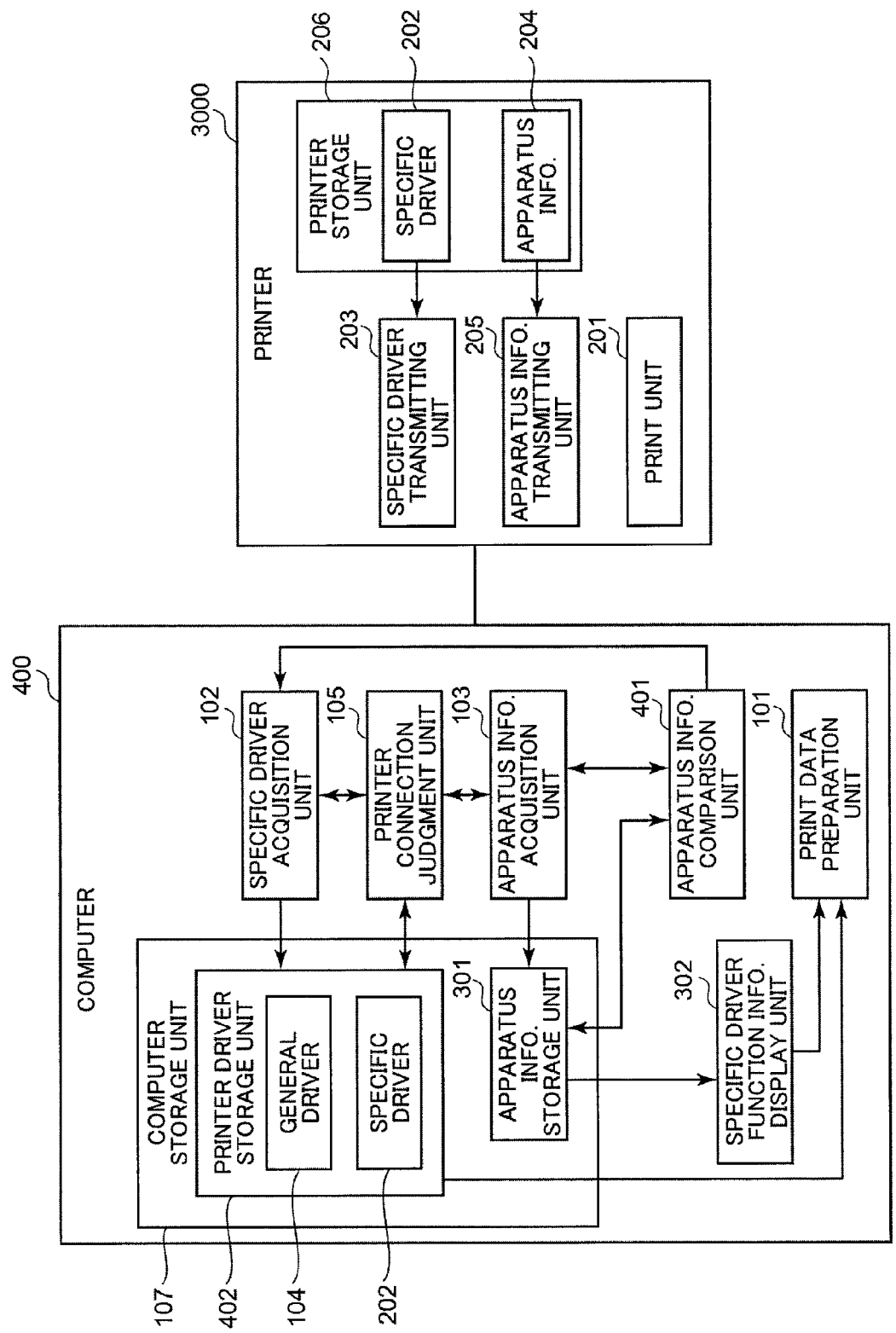
FIG. 12 is a block diagram illustrating a printing system according to a third embodiment of the present invention.

Referring to FIG. 12, a printing system according to a third embodiment of the present invention is illustrated. As illustrated in FIG. 12, the printing system includes a computer 400 serving as an information processing apparatus and a printer 3000 serving as an image forming apparatus. The computer 400 of the third embodiment is similar to the computer 300 of the second embodiment described above except for an apparatus information comparison unit 401 serving as a driver information comparison unit and a printer driver storage unit 402. The printer 3000 of the third embodiment is substantially similar to the printer 200 of the first embodiment. Only components and configurations of the computer 400 and the printer 3000 that differ from the computer 300 and the printer 200 of the above embodiments will be described, and like components will be given the same reference numerals as above and description thereof will be omitted. According to the third embodiment, a specific driver 202 of the printer 3000 is installed in the printer driver storage unit 402 of the computer 400 beforehand.

The apparatus information comparison unit 401 compares version information of the specific driver 202 of the printer 3000 included in apparatus information 204 acquired by an apparatus information acquisition unit 103 with version information of the specific driver 202 stored in the printer driver storage unit 402. In a case where the specific driver 202 is judged to be updated as a result of the version information comparison, the apparatus information comparison unit 401 supplies an instruction with respect to the specific driver acquisition unit 102 to acquire the specific driver 202. Upon receiving the acquisition instruction of the specific driver 202, a specific driver acquisition unit 102 acquires the specific driver 202 from the printer 3000, and updates the specific driver 202 stored in the printer driver storage unit 402, thereby upgrading the specific driver 202.

The apparatus information comparison unit 401 is mounted as a program in the computer 400. Such a program may be stored in a volatile memory of the computer 400 or a nonvolatile memory such as a read only memory (ROM). In addition, the program may be mounted as a nonvolatile rewritable storage device such as a flash memory or may be mounted as a magnetic medium such as hard disk.

Figure 13:
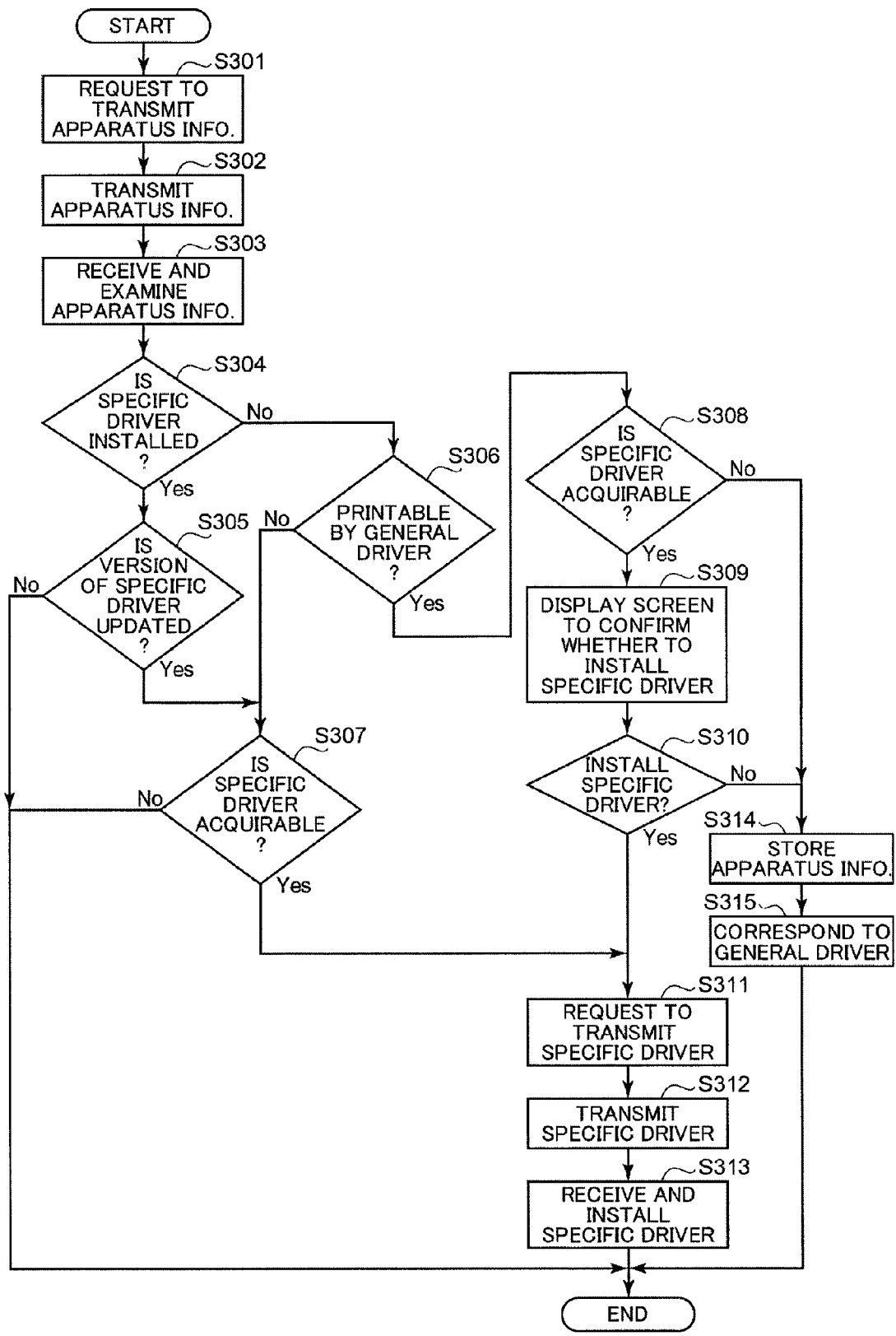
FIG. 13 is a flowchart illustrating an example procedure in a case where a computer serving as an information processing apparatus and a printer serving as an image forming apparatus are connected according to the third embodiment.

Referring to flowchart of FIG. 13, an example procedure in a case where the computer 400 and the printer 3000 are connected is illustrated. Since procedure flow of step S301 through step S304 and step S306 through step S315 of FIG. 13 is substantially similar to that of step S201 through step S204 and step S205 through step S214 of FIG. 9, respectively, description of each step is omitted.

In step S305, the apparatus information comparison unit 401 compares the version information of the specific driver 202 of the printer 3000 included in the apparatus information 204 acquired by the apparatus information acquisition unit 103 with the version information of the specific driver 202 stored in the printer driver storage unit 402, and examines whether or not the version of the specific driver 202 is updated. Particularly, in a case where the version information of the specific driver 202 included in the apparatus information 204 newly acquired from the printer 3000 is newer (superior) than the version information of the specific driver 202 stored in the printer driver storage unit 402, the apparatus information comparison unit 401 executes step S307 (described later). On the other hand, in a case where the version information of the specific driver 202 included in the apparatus information 204 newly acquired and the version information of the specific driver 202 stored in the printer driver storage unit 402 is substantially the same, or in a case where the version information of the specific driver 202 included in the apparatus information 204 is older (inferior) than the version information of the specific driver 202 stored in the printer driver storage unit 402, the apparatus information comparison unit 401 ends the procedure.

As described above, in a case where the computer 400 and the printer 3000 are connected, each of the version information of the specific driver 202 is compared according to the third embodiment. In a case where the specific driver 202 is updated, the specific driver installed in the computer 400 is updated, thereby maintaining the specific driver 202 installed in the computer 400 to be a latest version according to the third embodiment.

According to each of the first, second, and third embodiments of the present invention described above, the personal computer is used as the information processing apparatus, but is not limited thereto. A computer such as a server computer, a mobile computer, and a workstation may be used as the information processing apparatus. In addition, another mechanism having a function similar to such a computer may be used as the information processing apparatus. For example, an information terminal apparatus, a mobile phone, an electronic mail terminal device, a game terminal device, a set top box device, and the like may be used as the information processing apparatus. According to each of the first, second, and third embodiments of the present invention described above, the printer is used as the image forming apparatus, but is not limited thereto. A facsimile machine, a scanner, a photocopier, and a multi functional peripheral (MFP) having plural functions of the printer, the scanner, and the facsimile machine, for example, may be used as the image forming apparatus. In addition, according to each of the first, second, and third embodiments of the present invention, the computer and the printer are connected through the USB, but are not limited therethrough. For example, IEEE1394 bus connection, parallel or serial connection, SCSI connection and the like may applied in addition to the USB connection. Moreover, the computer and the printer may be connected through network such as local area network (LAN) or Internet. The computer and the printer may also be connected through wireless LAN, Bluetooth, infrared communication and the like instead of wire connection.

The present invention has been described above with regard to particular embodiments, but the present invention is not limited thereto. As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. A printing system comprising:
an information processing apparatus having a general printer driver operating in a course of preparing general print data having a basic instruction;
an image forming apparatus performing print operation based on print data including the general print data prepared by the information processing apparatus; and
a printer driver storage device storing a specific printer driver operating in a course of preparing specific print data having an instruction specialized for the image forming apparatus,
wherein the information processing apparatus further comprises:
a printer driver acquisition unit acquiring the specific printer driver stored in the printer driver storage device;
a printer connection detection unit allowing a user to select whether or not to acquire the specific printer driver in a case of detecting connection with the image forming apparatus, allowing the printer driver acquisition unit to acquire the specific printer driver based on a selection made by the user, and allowing one of the general and specific printer drivers to correspond to the image forming apparatus; and
a print data preparation unit preparing the print data using at least one of the respective general and specific printer drivers corresponded by the printer connection detection unit,
wherein the information processing apparatus supports the general printer driver and the specific printer driver, and the general printer driver and the specific printer driver can exist independently of one another and (i) are activated from a print instruction from application software, (ii) are adapted to obtain application data from the application software, and (iii) are adapted to convert the application data into print data readable by the image forming apparatus.

2. The printing system according to claim 1, wherein the printer connection detection unit judges, in a case of detecting connection with the image forming apparatus, whether or not the image forming apparatus can print the print data prepared by the general printer driver, and allows the specific printer driver to be acquired by the printer driver acquisition unit and the specific printer driver acquired to be installed in the information processing apparatus in a case where the image forming apparatus cannot print the print data.

3. The printing system according to claim 1, wherein the printer connection detection unit allows the general printer driver to correspond to the image forming apparatus in a case where the specific printer driver is not selected by the user.

4. The printing system according to claim 3, wherein the printer connection detection unit cancels correspondence between the general printer driver and the image forming apparatus in a case where the image forming apparatus is disconnected.

5. The printing system according to claim 1, wherein the image forming apparatus transmits driver information indicating an overview of a function or functions given to the specific printer driver to the information processing apparatus in a course of connecting with the information processing apparatus, and wherein the printer connection detection unit provides the driver information to the user when allowing the user to select whether or not to acquire the specific printer driver.

6. The printing system according to claim 5, wherein the information processing apparatus further comprises:

a driver information storage unit storing the driver information; and a driver information display unit providing a screen provided by the general printer driver, the display screen displaying the driver information of the specific printer driver stored in the driver information storage unit to the user and supplying an acquisition instruction of the specific printer driver to the printer driver acquisition unit based on an instruction of the user.

7. The printing system according to claim 6, wherein the driver information display unit displays in a course of setting a preparation parameter of the print data prepared by the print data preparation unit.

8. The printing system according to claim 7, wherein the driver information display unit saves the preparation parameter before the printer driver acquisition unit is operated, and restores the preparation parameter after the specific printer driver is acquired.

9. The printing system according to claim 5, wherein the driver information of the image forming apparatus includes version information of the specific printer driver, and wherein the information processing apparatus further comprises a driver information comparison unit comparing the version information of the specific printer driver installed in the information processing apparatus with the version information of the specific printer driver included in the driver information and allowing the printer driver acquisition unit to operate in a case where the specific printer driver is judged to be updated.

10. The printing system according to claim 5, wherein the driver information includes storage location information indicating a storage location of the specific printer driver of the printer driver storage device, and wherein the printer driver acquisition unit acquires the specific printer driver based on the storage location information.

11. An information processing apparatus comprising:

a general printer driver executed by a processor of the information processing apparatus, the general printer driver operating in a course of preparing general print data including a basic instruction;

a printer driver acquisition unit acquiring a specific printer driver from a printer driver storage device storing the specific printer driver operating in a course of preparing specific print data including an instruction specialized for an image forming apparatus;

a printer connection detection unit allowing a user to select whether or not to acquire the specific printer driver in a case of detecting connection with the image forming apparatus, allowing the printer driver acquisition unit to acquire the specific printer driver based on a selection made by the user, and allowing one of the general and specific printer drivers to correspond to the image forming apparatus; and a print data preparation unit preparing print data using at least one of the respective general and specific printer drivers corresponded by the printer connection detection unit, wherein the information processing apparatus supports the general printer driver and the specific printer driver, and the general printer driver and the specific printer driver can exist independently of one another and (i) are activated from a print instruction from application software, (ii) are adapted to obtain application data from the application software, and (iii) are adapted to convert the application data into print data readable by the image forming apparatus.

12. The information processing apparatus according to claim 11, the printer connection detection unit judges, in a case of detecting connection with the image forming apparatus, whether or not the image forming apparatus can print the print data prepared by the general printer driver, and allows the specific printer driver to be acquired by the printer driver acquisition unit and the specific printer driver acquired to be installed in the printer driver storage device in a case where the image forming apparatus cannot print the print data.

13. The information processing apparatus according to claim 11, wherein the printer connection detection unit allows the general printer driver to correspond to the image forming apparatus in a case where the specific printer driver is not selected by the user.

14. The information processing apparatus according to claim 13, wherein the printer connection detection unit cancels correspondence between the general printer driver and the image forming apparatus in a case where the image forming apparatus is disconnected.

15. The information processing apparatus according to claim 11, wherein the printer connection detection unit provides driver information, indicating an overview of a function or functions given to the specific printer driver, transmitted from the image forming apparatus in a course of connecting with the information processing apparatus when allowing the user to select whether or not to acquire the specific printer driver.

16. The information processing apparatus according to claim 15 further comprising:

a driver information storage unit storing the driver information; and a driver information display unit providing a screen provided by the general printer driver, the display screen displaying the driver information of the specific printer driver stored in the driver information storage unit and supplying an acquisition instruction of the specific printer driver to the printer driver acquisition unit based on an instruction of the user.

17. The information processing apparatus according to claim 16, wherein the driver information display unit displays in a course of setting a preparation parameter of the print data prepared by the print data preparation unit.

18. The information processing apparatus according to claim 17, wherein the driver information display unit saves the preparation parameter before the printer driver acquisition unit is operated, and restores the preparation parameter after the specific printer driver is acquired.

19. The information processing apparatus according to claim 15 further comprising a driver information comparison unit including version information of the specific printer driver installed in the information processing apparatus with version information of the specific printer driver included in the driver information of the image forming apparatus and allowing the printer driver acquisition unit to operate in a case where the specific printer driver is judged to be updated.

20. The information processing apparatus according to claim 15, wherein the driver information includes storage location information indicating a storage location of the specific printer driver of the printer driver storage device, and
wherein the printer driver acquisition unit acquires the specific printer driver based on the storage location information.

21. An information processing apparatus supporting a general printer driver and a specific printer driver, the information processing apparatus comprising:
a printer driver storage unit configured to store a general printer driver and a specific printer driver, the general printer driver and the specific printer driver existing individually of one another in the memory, wherein the general printer driver and the specific printer driver are (i) activated from a print instruction from application software, (ii) are adapted to obtain application data from the application software, and (iii) are adapted to convert the application data into print data readable by the image forming apparatus; and
a driver information display unit displaying function information of the specific printer driver on a display screen provided by the general printer driver.

22. The information processing apparatus of claim 21, further comprising an install button displayed by the information processing apparatus, the install button for installing the specific printer driver on the information processing apparatus.

23. A printing system comprising:
an information processing apparatus having a generally applicable printer driver operating in a course of preparing general print data having a basic instruction;
an image forming apparatus performing a print operation based on print data including the general print data prepared by the information processing apparatus; and
a printer driver storage device storing a specific printer driver that is specific to the information processing apparatus, the specific printer driver operating in a course of preparing specific print data having an instruction specialized for the image forming apparatus,
wherein the information processing apparatus further comprises:
a printer driver acquisition unit acquiring the specific printer driver stored in the printer driver storage device;
a printer connection detection unit allowing a user to select whether or not to acquire the specific printer driver in a case of detecting connection with the image forming apparatus, allowing the printer driver acquisition unit to acquire the specific printer driver based on a selection made by the user, and allowing one of the generally applicable and specific printer drivers to correspond to the image forming apparatus; and
a print data preparation unit preparing the print data using at least one of the respective generally applicable and specific printer drivers corresponded by the printer connection detection unit,
wherein the information processing apparatus supports the generally applicable printer driver and the specific printer driver, and the generally applicable printer driver and the specific printer driver can exist independently of one another and (i) are activated from a print instruction from application software, (ii) are adapt to obtain application data from the application software, and (iii) are adapted to convert the application data into print data readable by the image forming apparatus.

* * * * *